Aug. 14, 1928.
W. R. CHAPIN
COMPOSITE BRICK
Filed Feb. 2, 1928
1,681,028
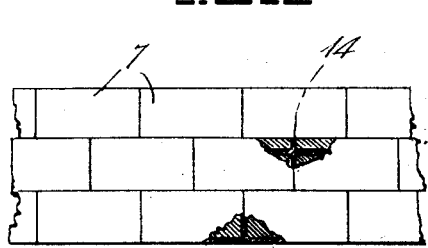
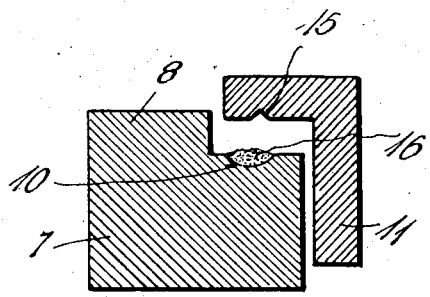
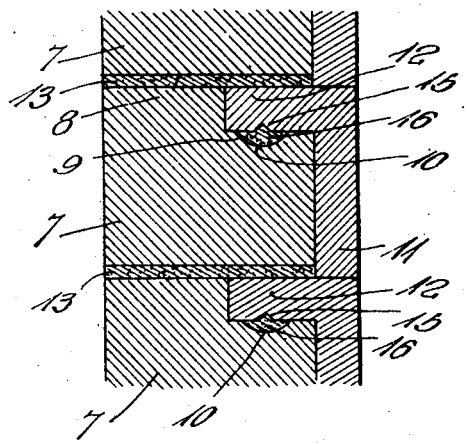
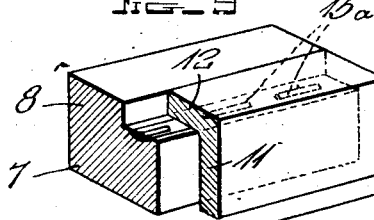
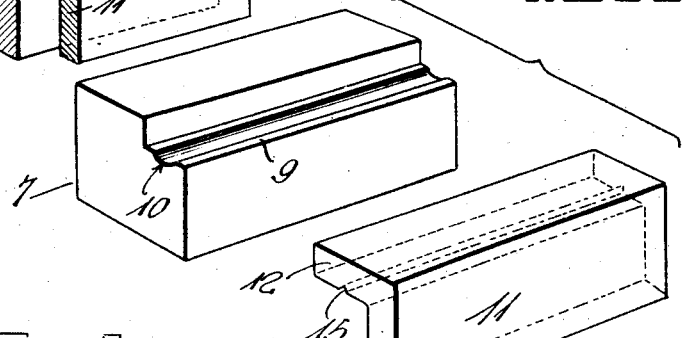
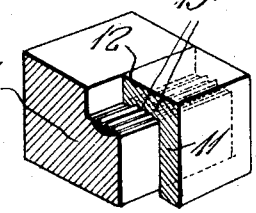
Inventor
William R. Chapin,
By H. B. Wilson & Co.
Attorneys
Witness Patented Aug. 14, 1928.

1,681,028

UNITED STATES PATENT OFFICE.

WILLIAM R. CHAPIN, OF WYOMING, PENNSYLVANIA, ASSIGNOR OF ONE-HALF TO STOGDELL S. STAPLES, OF WHITE HAVEN, PENNSYLVANIA.

COMPOSITE BRICK.

Application filed February 2, 1928. Serial No. 251,407.

The invention relates to improvements in bricks having separate facings, and it is the principal object of the invention to provide new and improved means for securing the facing and the brick body together.

A further object is to provide a construction in which registering recesses in the brick body and a portion of the facing, receive mortar or other plastic for keying said body and facing together, the portion of the plastic key received in the recess or recesses of the facing, being of such small horizontal dimensions as to readily permit breakage by hammering upon the facing, thereby allowing an injured facing to be readily removed and giving access to the plastic-receiving recess or recesses of the brick body for the purpose of removing the plastic therefrom. A new facing may then be quickly and easily substituted, and it will be obvious that such procedure is desirable regardless of the particular field of use to which the invention is applied, being particularly advantageous however when the composite brick is used in the construction of stove or furnace linings, kilns, smelters, etc., in which applications, the facing would be subjected to intense heat and would necessarily be renewed from time to time.

With the foregoing in view, the invention resides in the novel subject matter hereinafter described and claimed, description being accomplished by reference to the accompanying drawing.

Fig. 1 is a front elevation partly broken away and in section showing a number of composite bricks in assembled relation with each other.

Fig. 2 is a vertical transverse sectional view through one of the composite bricks showing the facing in readinesss for application to the brick body.

Fig. 3 is a sectional view through a number of the composite bricks with the facings and the brick bodies secured together.

Fig. 4 is a disassembled perspective view of a composite brick of the structure shown in the preceding figures.

Figs. 5 and 6 are fragmentary perspective views showing modified forms of facings.

The general construction selected for illustration in the present application, may be considered as preferred, and while this construction will be herein specifically described, it is to be understood that within the scope of the invention as claimed, variations may be made.

On the drawing, the numeral 7 denotes a brick body of substantially rectangular form but having a transversely stepped upper side, providing it with a relatively high step 8 and with a comparatively low step 9, said low step being formed with a shallow plastic-receiving groove 10 which is shown as extending uninterruptedly from end to end of said step.

A vertical facing 11 is provided to contact with the vertical side of the body 7 adjacent the low step 9, the upper portion of said facing being provided with a horizontal flange 12 to lie upon said step 9, the proportion of parts being such that the upper side of the flange 12 will be flush with the upper step 8 of the body 7 whereas the lower edge of said flange 12 may be sufficiently below the lower side of the body 7, to conceal the mortar 13 used between adjacent tiers of bricks. Also, the facing 11 is preferably of such length as to obscure the vertical mortar joints 14 between the bricks of each tier. If it is not desired to obscure the joints 13—14, the facing 11 will of course be somewhat smaller to prevent such obscuring.

In the form of construction shown in Figs. 1 to 4, the lower side of the flange 12 is provided with a longitudinal groove 15 which registers with the groove 10, whereby these two grooves may receive mortar or other plastic 16 to key the facing and the brick body together, as shown in Fig. 3. With the facing removed, the brick body 7 is laid upon the mortar joint 13, the groove 10 is then somewhat more than filled with the mortar 16 as shown in Fig. 2, and when the facing is then applied, the excess of mortar is received in the groove 15, thereby establishing a key which locks the facing and the brick body together.

Attention is invited to the fact that the groove 15 is of a very small horizontal dimension compared to the horizontal width of the groove 10. Thus, the portion of the plastic key received in this groove 15, is in the nature of a narrow rib as will be clear from Fig. 3. This rib is sufficient to secure the facing to the brick body and to remain intact in use. Should the facing be injured however, if its exterior is rather forcibly struck with a hammer or the like, the rib within the groove 15 will be broken, thus freeing the flange 12 and the facing 11 and permitting easy removal of the latter. Upon such removal, the remaining plastic in the groove 10 is readily accessible and may be removed. Then, this grove may be refilled and a new facing applied. This characteristic of the invention is of advantage in a number of arts, but particularly when the facing 11 forms part of a fire brick structure which must be renewed from time to time.

Fig. 5 illustrates the fact that instead of using one groove 15 extending from end to end of the flange 12, said flange may be provided with a plurality of short, narrow grooves 15ª disposed in end to end relation. Similarly, Fig. 6 is illustrative of the fact that if desired a plurality of parallel narrow grooves 15ᵇ may be formed in the flange 12. In any isntance, the groove or grooves register with the groove 10 of the brick body 7 and receive sufficient plastic material from said groove, to establish a key between facing and brick body, but this key or connection may be broken as above stated, when it is necessary to remove one facing and substitute another.

Excellent results are obtainable from the general construction shown and described, and it is therefore preferably followed. However, attention is again invited to the fact that within the scope of the invention as claimed, variations may be made.

I claim:—

1. A composite brick comprising a body, and a facing having a portion resting on said body, the upper side of said body and the lower side of said portion of the facing being formed with registering recesses, said recesses being adapted to receive a plastic for keying the facing and body together and being of such relative dimensions as to readily permit the breaking of the plastic key for removal of an injured facing without disturbing any of the other facings.

2. A composite brick comprising a body, and a facing having a portion resting on said body, the upper side of said body having a plastic-receiving recess, said portion of the facing being formed with a recess in its lower side registering with said recess of the body to also receive the plastic, said recess of said portion of the facing being of such small horizontal dimensions as to permit recepton of only a small quantity of the plastic therein; whereby the latter may be readily broken to permit removal of an injured facing.

3. A composite brick comprising a body whose upper side is transversely stepped, providing it with a relatively low step and a comparatively high step, said low step having a longitudinal groove, and a vertical facing contacting with said body and having a horizontal flange lying on said low step, the lower side of said flange being formed with a longitudinal groove registering with the aforesaid groove; whereby the two grooves may receive a plastic to key the facing and body together said grooves being of such relative dimensions as to permit the breaking of the plastic key for removal of an injured facing without disturbing any of the other facings.

4. A composite brick comprising a body whose upper side is transversely stepped, providing it with a relatively low step and a comparatively high step, said low step having a longitudinal groove, and a vertical facing contacting with said body and having a horizontal flange lying on said low step, the lower side of said flange being formed with a longitudinal groove registering with and considerably narrower than the aforesaid groove; whereby the two grooves may receive a plastic to key the facing and body together, and whereby the small amount of plastic received in the narrow groove may be readily broken to permit removal of an injured facing.

In testimony whereof I have hereunto affixed my signature.

WILLIAM R. CHAPIN